US009506404B2

(12) United States Patent
Fardel et al.

(10) Patent No.: US 9,506,404 B2
(45) Date of Patent: Nov. 29, 2016

(54) ASSEMBLY COMPRISING A PROTECTION DEVICE AND A TURBINE MACHINE ELEMENT FOR PROTECTING

(75) Inventors: Philippe Fardel, Vert Saint Denis (FR); Georges Cousseau, Melun (FR); Denis Barthelemy, Cesson (FR); Joel Roudil, Vert Saint Denis (FR)

(73) Assignee: SNECMA, Paris (FR)

( * ) Notice: Subject to any disclaimer, the term of this patent is extended or adjusted under 35 U.S.C. 154(b) by 441 days.

(21) Appl. No.: 14/111,957

(22) PCT Filed: Apr. 13, 2012

(86) PCT No.: PCT/FR2012/050821
§ 371 (c)(1),
(2), (4) Date: Oct. 15, 2013

(87) PCT Pub. No.: WO2012/146856
PCT Pub. Date: Nov. 1, 2012

(65) Prior Publication Data
US 2014/0033675 A1    Feb. 6, 2014

(30) Foreign Application Priority Data
Apr. 28, 2011   (FR) .................................... 11 53635

(51) Int. Cl.
F02C 7/24    (2006.01)
F02C 7/20    (2006.01)
(Continued)

(52) U.S. Cl.
CPC ................. *F02C 7/20* (2013.01); *F01D 25/08* (2013.01); *F01D 25/14* (2013.01); *F01D 25/18* (2013.01); *F02C 7/24* (2013.01); *F05D 2260/30* (2013.01); *Y02T 50/675* (2013.01)

(58) Field of Classification Search
CPC .............. F02C 7/25; F02C 7/32; F02C 7/20; F02C 7/24; F01D 25/145; F01D 25/18; F01D 25/285; F01D 25/08; F01D 25/14; Y10T 24/31; Y10T 24/37; Y10T 24/465; Y10T 403/587; F16B 39/20; A44B 9/12; A44B 9/18; A44B 9/20; A44B 6/00; B64D 37/02; B64D 37/04; F05D 2260/30
See application file for complete search history.

(56) References Cited

U.S. PATENT DOCUMENTS 1,865,040 A * 6/1932 Parker ..................... A41F 15/02
                                                          24/299
2,860,397 A * 11/1958 Green ..................... A44B 9/12
                                                          24/708.7
(Continued)

FOREIGN PATENT DOCUMENTS

CN    2 176 999     9/1994
DE    27 13 077    10/1977
(Continued)

OTHER PUBLICATIONS

International Search Report Issued Jul. 10, 2012 in PCT/FR12/050821 Filed Apr. 13, 2012.

*Primary Examiner* — Andrew Nguyen
*Assistant Examiner* — Jason H Duger
(74) *Attorney, Agent, or Firm* — Oblon, McClelland, Maier & Neustadt, L.L.P.

(57) ABSTRACT

An assembly including a protection device and an element of a turbine engine for protecting, for example, an oil tank including a magnetic particle detector, the protection device including a flexible protection blanket placed on and closed around the element for protecting and including eyelets that are engaged on fastener studs provided on the blanket or on the element for protecting. The protection device further includes at least one cable carrying an attachment mechanism for attaching to the fastener studs to prevent the studs being withdrawn from the eyelets in the blanket.

8 Claims, 2 Drawing Sheets

(51) Int. Cl.
*F01D 25/08* (2006.01)
*F01D 25/14* (2006.01)
*F01D 25/18* (2006.01)

(56) References Cited

U.S. PATENT DOCUMENTS

| | | | | |
|---|---|---|---|---|
| 3,175,453 A * | 3/1965 | Williams | ............... | F16B 21/12 403/316 |
| 3,229,742 A * | 1/1966 | Buckland | ............... | F16B 39/20 411/87 |
| 4,157,602 A * | 6/1979 | Pennell | ............... | E05B 73/0005 24/122.3 |
| 5,167,059 A * | 12/1992 | Plasse | ............... | B25B 23/0092 29/252 |
| 5,174,702 A * | 12/1992 | Dolin | ............... | B60B 3/145 411/102 |
| 5,249,926 A * | 10/1993 | D'Anna | ............... | B64C 27/50 416/142 |
| 5,380,224 A * | 1/1995 | DiCicco | ............... | H01R 4/70 439/447 |
| 5,489,174 A * | 2/1996 | Lesson | ............... | F16B 39/20 403/212 |
| 5,624,218 A * | 4/1997 | Dauwalter | ............ | F16B 39/101 411/373 |
| 5,654,060 A * | 8/1997 | Holman | ............... | B32B 5/22 112/420 |
| 7,584,582 B1 * | 9/2009 | Hutter, III | ............... | B64C 1/40 156/91 |
| 7,878,747 B2 * | 2/2011 | Dean | ............... | A47G 3/00 411/372.5 |
| 8,752,641 B2 * | 6/2014 | Holland | ............... | F02C 7/25 169/48 |
| 2010/0074735 A1 * | 3/2010 | Cai | ............... | F01D 25/145 415/177 |

FOREIGN PATENT DOCUMENTS

| | | |
|---|---|---|
| GB | 790 030 | 1/1958 |
| WO | 2007 097639 | 8/2007 |

\* cited by examiner

ASSEMBLY COMPRISING A PROTECTION DEVICE AND A TURBINE MACHINE ELEMENT FOR PROTECTING

BACKGROUND OF THE INVENTION

Field of the Invention

The present invention relates to an assembly comprising a protection device, e.g. a thermal protection device, and a turbine machine element for protecting, such as an oil tank fitted with a magnetic particle detector, for example.

Such an oil tank is fitted to a turbine engine and is attached to the fan casing in order to feed oil to moving parts for lubricating such as bearings or gearing.

Description of the Related Art

The oil tank is conventionally fitted with a magnetic particle detector making it possible to determine such particles have been released into the oil circuit by the parts being lubricated. The quantity and the nature of magnetic particles are detected in order to determine whether the origin and the criticality of the wear they represent.

The oil tank and the magnetic particle detector must be capable of withstanding fire, should one occur. In particular, they must be capable of withstanding a temperature of about 1200° C. for a period lying in the range 5 minutes to 6 minutes.

For this purpose, it is known to use a thermal protection blanket that is placed on and that encloses at least part of the tank and the detector. The blanket has eyelets for engaging on fastener studs, the eyelets and the studs being provided on the blanket, said studs including holes in which lockwires are engaged after the blanket has been closed. Thereafter the lockwires are crimped so as to avoid any accidental opening of the lockwires and thus any removal of the blanket.

In order to access the particle detector during an underwing maintenance operation on an airplane, an operator cuts each of the lockwires so as to be able to remove the blanket and have access to the tank and to the particle detector. Pieces of lockwire can then drop onto the tarmac.

These pieces of lockwire can penetrate into the tires of airplanes taxiing on the tarmac or they can become ingested by turbine engines because of their low weight.

BRIEF SUMMARY OF THE INVENTION

A particular object of the invention is to provide a solution to this problem that is simple, effective, and inexpensive.

To this end, the invention provides an assembly comprising a protection device and an element of a turbine engine for protecting, such as for example an oil tank provided with a magnetic particle detector, the protection device comprising a flexible protection blanket placed on and closed around the element for protecting and including eyelets that are engaged on fastener studs provided on the blanket or on the element for protecting, the assembly being characterized in that the protection device includes at least one cable carrying attachment means for attaching to the fastener studs so as to prevent the studs being withdrawn from the eyelets in the blanket.

The attachment means thus hold the blanket in position on the fastener means.

In order to access the particle detector during a maintenance operation, the operator has no need to cut the cable. It suffices to withdraw each of the attachment means from the fastener means, the attachment means remaining fastened to the cable so that nothing can drop on the ground. The above-mentioned risks are thus avoided.

According to a characteristic of the invention, the attachment means comprise pins or spiral rings having branches or portions for passing through holes in the fastener means of the element.

Preferably, the cable has end loops in which attachment means are engaged.

Advantageously, movable attachment means are movable on the cable on which the end loop of the attachment means engaged in said loop form abutments, preventing the movable attachment means being withdrawn from the cable.

The removable attachment means can thus easily be moved along the cable in order to make them easier to mount on the fastener means.

According to one possibility of the invention, the protection device includes at least two cables connected together via attachment means.

The attachment means providing links between the cables can remain mounted on fastener means of the element for protecting. Thus, during a maintenance operation, the cables and the attachment means always remain fastened to the element for protecting.

Advantageously, the cable is made by braiding wires and is surrounded by a sheath, e.g. a heat-shrink sheath.

A braided cable presents greater flexibility than a non-braided cable. The sheath prevents an operator being injured in the event of the braided cable becoming worn or against the ends of the loop.

According to another characteristic of the invention, the cable and the attachment means are made of stainless steel.

The invention also provides a turbine engine including an assembly according to any preceding claim, wherein the element for protecting is an oil tank fitted with a magnetic particle detector.

BRIEF DESCRIPTION OF THE SEVERAL VIEWS OF THE DRAWINGS

The invention can be better understood and other details, characteristics, and advantages of the invention appear on reading the following description made by way of non-limiting example and with reference to the accompanying drawings, in which.

DETAILED DESCRIPTION OF THE INVENTION

Figure 1:
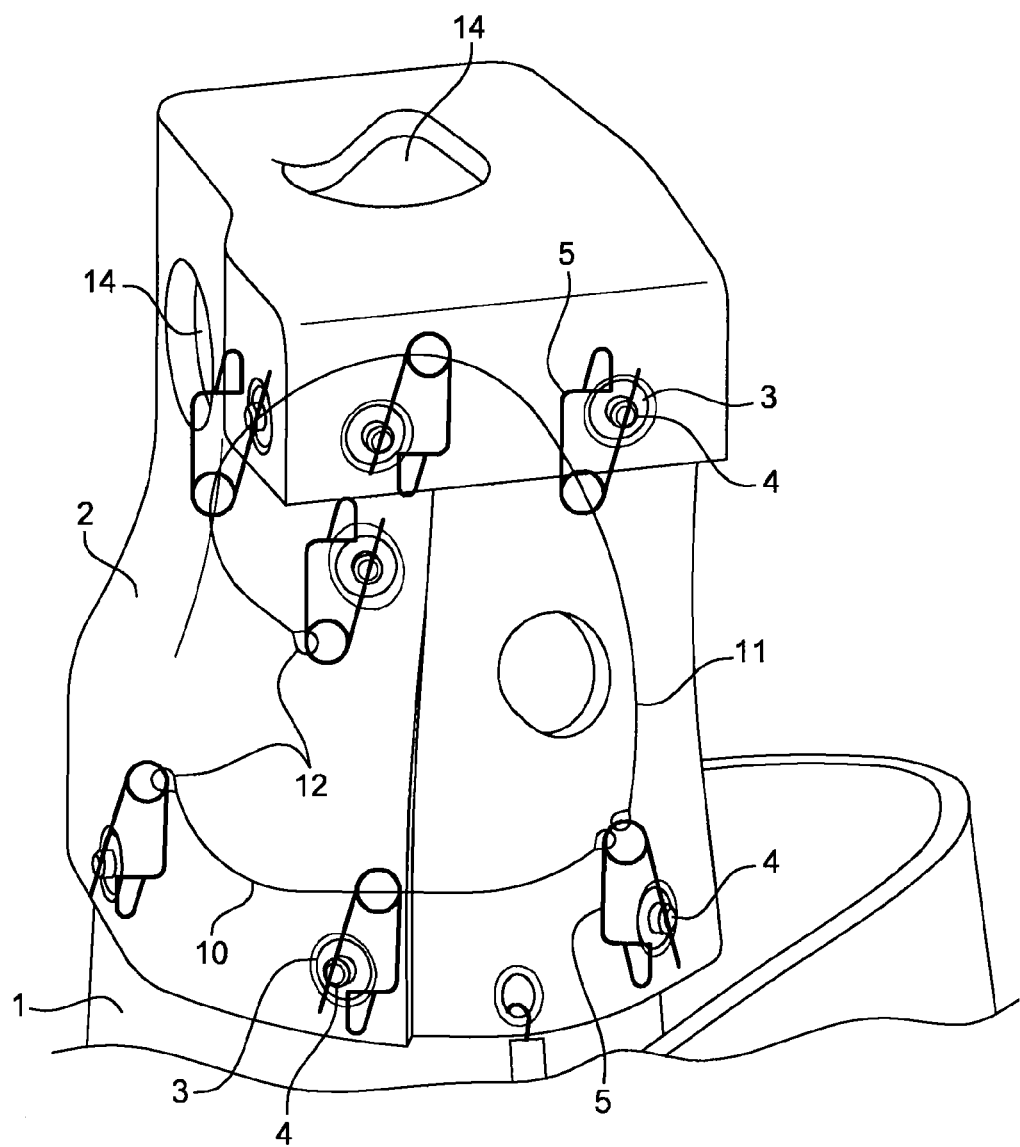
FIG. 1 is a diagrammatic view of a portion of a tank fitted with a particle detector, the tank and the detector being covered by a protection device of the invention.

An embodiment of the invention is described below with reference to FIG. 1 showing an oil tank 1 fitted with a magnetic particle detector (not visible), the tank and the detector being covered in part by a flexible heat protection blanket 2 placed on the tank 1 and the detector and closed around them. Once closed, the blanket 2 has overlap zones. In a variant, the flexible blanket 2 could serve to provide protection against dust or against impacts, for example.

The blanket 2 has openings formed by eyelets 3 through which fastener studs 4 provided on the blanket 2 pass, and openings 14 serving to connect hydraulic pipes and a harness, i.e. electric cables. In a variant, the studs 4 may be provided on the oil tank 1 and/or on the magnetic particle detector.

The eyelets 3 and the studs 4 are placed facing one another in the overlap zones of the blanket 2.

The studs 4 have through holes extending perpendicularly to the axes of the studs 4, in which attachment means constituted by pins 5 are engaged.

Figure 2:
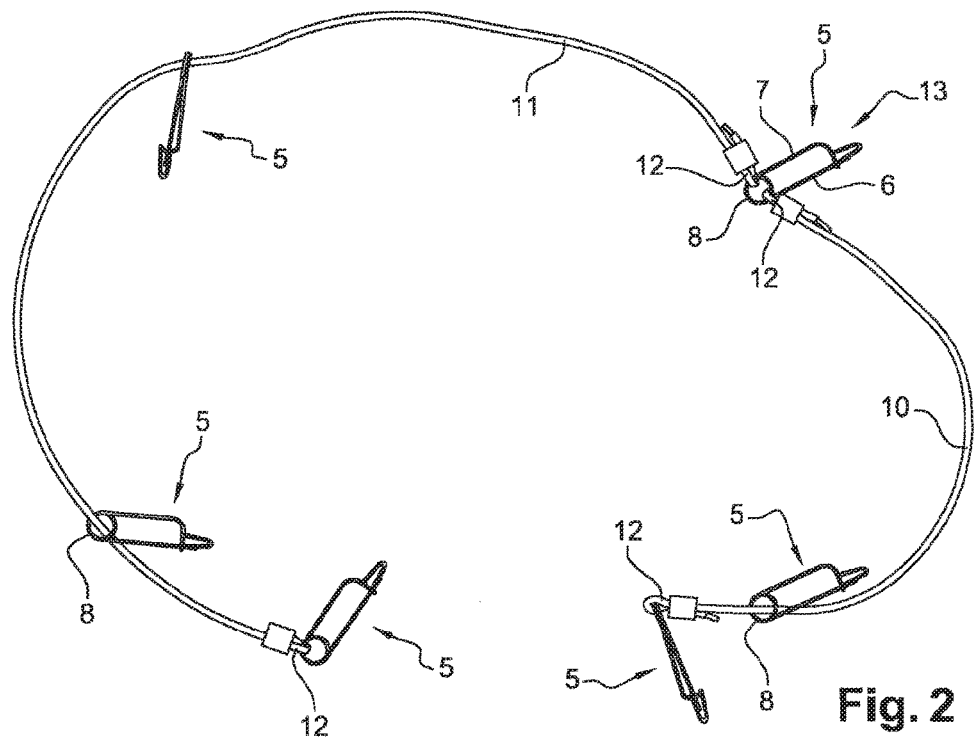
FIG. 2 is a view of cables and attachment means.
Figure 3:
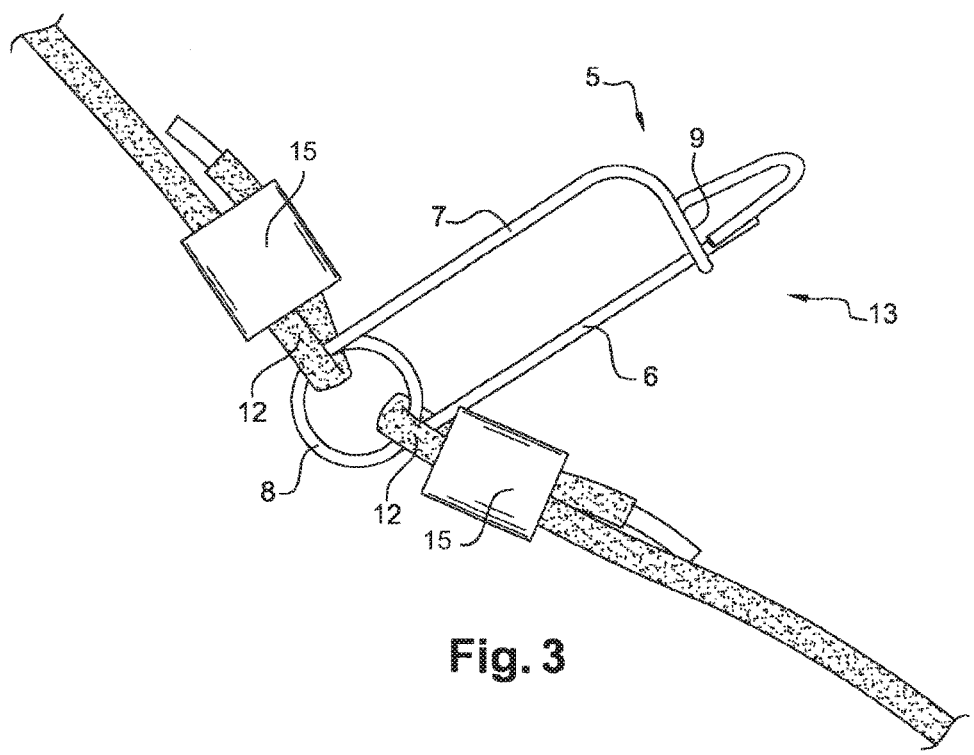
FIG. 3 is an enlarged view of a portion of FIG. 2, showing two cables connected together by attachment means.

As can be seen better in FIGS. 2 and 3, each pin 5 is constituted by a stainless steel wire folded so as to form two branches 6 and 7 that are connected together at one end by a loop 8 made by winding the wire and forming a torsion spring between the branches 6 and 7.

The torsion spring 8 serves to stress the branches 6 and 7 of the pin 5 so as to urge them apart from each other.

Remote from the torsion spring 8, the free end of the branch 7 has a hook 9 formed by folding the wire and serving to receive the free end of the branch 6 when the branches 6 and 7 are brought together, i.e. when the pin 5 is in the closed position. In this position, the torsion spring 8 serves to avoid the free end of the branch 6 disengaging from the hook 9 of the branch 7, and thus to avoid the pin 5 opening accidentally. The length of the branches 6 and 7 is greater than the diameter of the studs 4 or the diameter of the eyelets 3.

The operation of the pin 5 is thus identical to that of a safety pin.

In the attachment position, the branch 6 of each pin 5 is engaged in a hole in a stud 4, with the pins 5 being closed. The branches 6 thus form stop means preventing the studs 4 from being withdrawn from the eyelets 3.

In a variant, the pins 5 could be replaced by spiral rings likewise passing through the holes in the studs 4.

The pins 5 are all fastened to one or more cables 10, 11. In the embodiment shown in the figures, some of the pins 5 are fastened to a first cable 10 and the other pins 5 are fastened to a second cable 11. The cables 10 and 11 are made by braiding stainless steel wires and they are surrounded by protective sheaths of plastics material, e.g. of heat-shrink material.

Each cable 10, 11 has end loops 12 crimped by cuffs 15 of stainless steel, the pins 5 being engaged in the loops 12 by means of their torsion springs 8.

Other pins 5, referred to as movable pins, are mounted to be movable along the cables 10, 11, with the cuffs 15 or the pins 5 fastened to the loop 12 then forming abutments that prevent the movable pins 5 from being removed from the cables 10, 11.

Each pin 5 is engaged on the corresponding cable 10, 11 via its closed loop forming the torsion spring 8. The pins 5 are thus all mounted in captive manner on one or the other of the cables 10 or 11.

The two cables 10 and 11 are connected together by a link pin 13 designed to remain on a corresponding stud 4 when accessing the particle detector. The structure of the link pin is identical to the structure of the other pins. In a variant, the link pin 13 could be replaced by a spiral ring.

Thus, in order to access the particle detector, an operator opens all of the pins 5 and detaches them from the studs 4, with the exception of the link pin 13. The pins 5 remain fastened to the cables, which are themselves suspended from the blanket 2 by the link pin 13.

Once released, the thermal protection blanket 2 can be opened so as to release access to the particle detector.

Thereafter, the operator can replace the blanket 2 around the tank 1 and the particle detector. For this purpose, the eyelets 3 are put back on the corresponding studs 4, and then the pins 5 are attached once more to the studs 4 by inserting the branches 6 in the holes in the studs 4 and by closing the pins 5.

Once the pins 5 have been closed, the blanket is securely fastened on the tank 1 and on the particle detector. It should be observed that the cables 10, 11 and the pins 5 are held captive, even while accessing the particle detector, and therefore do not run any risk of falling to the ground, since the pin 13 remains fastened to the blanket 2.

The invention thus provides a thermal protection device that avoids accidentally damaging aircraft tires or turbine engines, as mentioned above.

The invention claimed is:

1. An assembly comprising:
    an oil tank including a magnetic particle detector;
    a flexible protection blanket placed on and closed around the oil tank, the flexible protection blanket including eyelets that are engaged on fastener studs provided on the flexible protection blanket or on the oil tank;
    a cable; and
    a first pin and a second pin carried by the cable and attached to the fastener studs to prevent the fastener studs from being withdrawn from the eyelets in the flexible protection blanket,
    wherein the first pin is mounted so as to be movable along the cable,
    wherein an end of the cable is fixedly attached to the second pin,
    wherein, in a first state of the assembly, the first and second pins are closed such that the magnetic particle detector is not accessible, and
    wherein, in a second state of the assembly, the first pin is open and the second pin is closed such that the magnetic particle detector is accessible and the cable is suspended by the second pin.

2. An assembly according to claim 1, wherein the first and second pins include branches for passing through holes in the fastener studs.

3. An assembly according to claim 1, wherein the end of the cable includes an end loop in which the second pin is engaged.

4. An assembly according to claim 3, wherein the the second pin engaged in the end loop of the cable forms an abutment which prevents the first pin from being withdrawn from the cable.

5. An assembly according to claim 1, comprising at least two cables connected together via the second pin.

6. An assembly according to claim 1, wherein the cable includes braiding wires and is surrounded by a sheath, or a heat-shrink sheath.

7. An assembly according to claim 1, wherein the cable and the first and second pins are made of stainless steel.

8. An assembly according to claim 2, wherein the branches include a first branch and a second branch connected together at a first end by a loop forming a torsion spring between the first and second branches, and a free second end of the first branch includes a hook which receives a free second end of the second branch when the first and second branches are brought together, and
    wherein the first and second pins are engaged with the cable via the loop.

* * * * *